United States Patent
Harding (10) Patent No.: US 9,268,904 B1
(45) Date of Patent: Feb. 23, 2016

(54) SYSTEMS AND METHODS FOR BIOMETRIC DATA MANAGEMENT USING RELATIONAL DATABASE MANAGEMENT SYSTEMS (RDBMS)

(71) Applicant: ImageWare Systems, Inc., San Diego, CA (US)

(72) Inventor: David Harding, Portland, OR (US)

(73) Assignee: ImageWare Systems, Inc., San Diego, CA (US)

(*) Notice: Subject to any disclaimer, the term of this patent is extended or adjusted under 35 U.S.C. 154(b) by 226 days.

(21) Appl. No.: 14/044,747

(22) Filed: Oct. 2, 2013

Related U.S. Application Data (60) Provisional application No. 61/708,897, filed on Oct. 2, 2012.

(51) Int. Cl.
*G06F 17/30* (2006.01)
*G06F 19/28* (2011.01)

(52) U.S. Cl.
CPC .......... *G06F 19/28* (2013.01); *G06F 17/30595* (2013.01)

(58) Field of Classification Search
USPC .................. 707/607, 609, 687, 790, 813, 821
See application file for complete search history.

(56) References Cited

U.S. PATENT DOCUMENTS

| | | | |
|---|---|---|---|
| 7,606,396 B2 | 10/2009 | Miller et al. | |
| 7,689,005 B2 | 3/2010 | Wang et al. | |
| 7,949,156 B2 | 5/2011 | Willis | |
| 8,132,226 B1 | 3/2012 | Bianco et al. | |
| 8,144,941 B2 | 3/2012 | Adams et al. | |
| 8,887,259 B1 * | 11/2014 | Harding | G06F 21/32 713/185 |
| 2002/0112177 A1 * | 8/2002 | Voltmer | G06F 21/32 726/26 |
| 2012/0140993 A1 | 6/2012 | Bruso et al. | |
| 2012/0148115 A1 | 6/2012 | Birdwell et al. | |
| 2013/0103951 A1 * | 4/2013 | Klevan | H04L 9/3231 713/186 |

FOREIGN PATENT DOCUMENTS

WO    WO2006/049520    5/2006

* cited by examiner

*Primary Examiner* — Sana Al Hashemi
(74) *Attorney, Agent, or Firm* — San Diego IP Law Group LLP (57) ABSTRACT

A structured query language (SQL) relational database management system (SQL RDBMS) may integrate a biometric subsystem to process and manage biometric data separately from the demographic data stored in normalized SQL tables of the SQL RDBMS. The SQL RDBMS may be operatively connected to the biometric subsystem by means of SQL extensions. The SQL RDBMS may execute queries with demographic and/or biometric constraints, wherein the demographic data is retrieved directly from normalized SQL tables on the RDBMS, while the biometric data is retrieved in the form of scores or probabilities from the biometric subsystem. The SQL RDBMS may return a query result set containing demographic data associated with corresponding biometric data, allowing the authentication of biometric clients.

20 Claims, 7 Drawing Sheets

SYSTEMS AND METHODS FOR BIOMETRIC DATA MANAGEMENT USING RELATIONAL DATABASE MANAGEMENT SYSTEMS (RDBMS)

CROSS REFERENCE TO RELATED APPLICATIONS

This application claims priority under 35 U.S.C. §119(e) to U.S. Provisional Application No. 61/708,897, filed Oct. 2, 2012, and entitled "SYSTEMS AND METHODS FOR BIOMETRIC DATA MANAGEMENT USING RELATIONAL DATABASE MANAGEMENT SYSTEMS (RDBMS)," the disclosure of which is hereby incorporated by reference in its entirety.

BACKGROUND OF THE INVENTION

1. Field of Invention

The present disclosure is related to biometric authentication, and more specifically, to a relational database management system that may perform biometric authentication.

2. Description of Related Art

The need to establish personal identity occurs, for most individuals, many times a day. For example, a person may have to establish identity in order to gain access to physical spaces, computers, bank accounts, personal records, restricted areas, reservations, and the like. Identity is typically established by something we have (e.g., a key, driver license, bank card, credit card, etc.), something we know (e.g., computer password, PIN number, etc.), or some unique and measurable biological feature (e.g., our face recognized by a bank teller or security guard, etc.). The most secure means of identity is a biological (or behavioral) feature that can be objectively and automatically measured and is resistant to impersonation, theft, or other fraud. The use of biometrics, which are measurements derived from human biological features, to identify individuals is a rapidly emerging science.

Biometrics is a generic term for characteristics that can be used to distinguish one individual from another, particularly through the use of digital equipment. An example of a biometric is a fingerprint. Trained analysts have long been able to match fingerprints in order to identify individuals. More recently, computer systems have been developed to match fingerprints automatically. Examples of biometrics used to identify or authenticate the identity of individuals include 2D face, 3D face, hand geometry, single fingerprint, ten finger live scan, iris, palm, full hand, signature, ear, finger vein, retina, DNA and voice. Other biometric may include characteristic gaits, lip movements and the like. New biometric are being developed or discovered continually.

It is common to employ a relational database management systems (RDBMS) to manage biometric data. Such relational database management systems are not designed specifically for the processing of biometric data and may often impose resource-intensive processes, thereby utilizing a high number of computing resources (e.g., power, processor storage, memory, and/or network capacity). The resource utilization may incur a significant delay in performing the biometric analysis and matching requests.

In justice and law enforcement, biometrics technology may be applicable for analyzing crime scenes and suspects. Biometric databases for law enforcement applications may contain thousands or millions of records and the identification of a criminal or suspect may need to be determined in a fast and accurate way before they may cause harm to someone. Thus, there exists the need for an effective database architecture model for managing biometric data in a RDBMS.

U.S. Pat. No. 7,689,005 issued to Wang et al. discloses a method and system for constructing a database management system for managing biometric data. The disclosed system in Wang receives data from another database or from and enrollment process, encodes the data with an encoding plug-in, and stores the encoded data in a biometric data storage. The data may be enhanced before being stored. Incoming target data likewise is encoded using an encoding plug-in and may be pre-processed, and is sent to a matching algorithm that is either built-in or a plug-in algorithm.

U.S. Pat. No. 7,949,156 issued to Willis et al. discloses a method for analyzing a dataset comprising biographic data and biometric data. In one step, a biographic record is read that is normally meant for unique description of an individual. A biometric associated with the biographic record is also read. The biometric is correlated with a plurality of biometrics associated with other biographic records. The uniqueness of the biometric is assessed with respect to the plurality of biometrics, for example, to find duplicate biographic records with biometric matching.

However, the prior art falls short because it does not convert biometric data into a biometric template that can be compared to a plurality of stored biometric templates to see if there is a match and does not process biometric data separately from demographic data allowing a faster and more accurate execution of queries including both demographic and biometric constraints.

SUMMARY OF THE INVENTION

According to some embodiments of the present disclosure, the capabilities of the structured query language (SQL) of a RDBMS may be extended through the integration of a real-time biometric subsystem. Said biometric subsystem may be operatively coupled to the SQL RDBMS via SQL extensions. In addition, the SQL RDBMS may include normalized tables—separated from the biometric subsystem—where demographic data may be stored.

The biometric subsystem may comprise proprietary biometric management functions, a template data manager, and a non-normalized biometric data cache. The biometric management functions in concert with the template data manager may process and convert biometric data into biometric templates which are subsequently stored in the non-normalized biometric data cache. The operation of the biometric subsystem may allow the SQL RDBMS to process biometric data separately from the demographic data stored in normal SQL tables, allowing a faster and more accurate execution of queries that may include a combination of demographic and biometric constraints.

According to an embodiment, the SQL RDBMS may receive a query with demographic and/or biometric constraints, wherein the demographic data may be retrieved directly from the normal SQL tables of the SQL RDBMS according to the demographic restraint of the query. In a separate process that occurs in the biometric subsystem, the biometric restraint of the query may be processed and analyzed by the biometric management functions and the template data manager to match against stored biometric templates in the non-normalized biometric data cache. The results of the biometric matching may then be returned in the form of biometric scores or probabilities which can then be associated with the demographic results from the normal SQL tables. As such, the returned data set from the SQL RDBMS to the corresponding biometric clients or users may contain demographic data associated with biometric data, allowing authentication of biometric users.

In another embodiment, the SQL RDBMS may receive a query with a plurality of biometric constraints, wherein the biometric subsystem may analyze said biometric constraints to return a plurality of biometric scores or probabilities corresponding to each query biometric restraint. In addition, the SQL RBDMS may receive also a query with a plurality of different types of biometrics constraints such as iris, face, and/or fingerprint; wherein the biometric subsystem may process and analyze the different types of biometric constraints to return a fusion biometric score or probability.

The SQL RDBMS may execute queries including SELECT statements with demographic and/or biometric constraints to authenticate biometric users, along with other SQL statements such as INSERT, DELETE and UPDATE to manage demographic data and biometric data in the normal SQL tables and the biometric subsystem respectively.

In another embodiment, the SQL RDBMS may contain relational database views created using user defined functions including demographic and/or biometric data that may be used in conjunction with a client application to limit client access and therefore increase system security.

Embodiments of the present disclosure may further include a web interface that may provide connection of a plurality of biometric clients to the SQL RDBMS over a network such as the internet.

In one embodiment, a system comprises: a biometric management function configured to receive and analyze biometric data; a template data manager coupled to the biometric management function, the template data manager configured to create a biometric template by converting the biometric data; and a biometric data cache coupled to the template data manager, the biometric data cache configured to store a plurality of stored biometric templates, wherein the template data manager compares the created biometric template with the plurality of stored biometric templates to form a biometric score.

The biometric score may comprise a probability of an enrolled biometric user and the biometric data representing the same identity or may result in a biometric authentication of a biometric user when the biometric score exceeds a threshold. The biometric data may comprise a plurality of biometric data, such as an iris, a face, or a fingerprint. The system may further comprise a structured query language extension coupled to the biometric management function. The structured query language extension may be configured to couple to a structured query language in a relationship database management system. The structured query language may comprise a select statement, an insert statement, a delete statement, or an update statement. The biometric data may be provided through a biometric user through a web interface. The web interface may provide the biometric data over a network such as the Internet. The biometric data cache may comprise a non-normalized biometric data cache.

In another embodiment, a method comprises the steps of: receiving and analyzing biometric data using a biometric management function; creating a biometric template using a template data manager by converting the biometric data; and storing a plurality of stored biometric templates using a biometric data cache, wherein the template data manager compares the created biometric template with the plurality of stored biometric templates to form a biometric score. The biometric score may comprise a probability of an enrolled biometric user and the biometric data representing the same identity or may result in a biometric authentication of a biometric user when the biometric score exceeds a threshold. The biometric data may comprise a plurality of biometric data.

In a further embodiment, a system comprises: a relationship database management system comprising a structured query language extension; a biometric subsystem coupled to the structured query language extension, wherein the biometric subsystem comprising a biometric management function configured to receive and analyze biometric data; a template data manager coupled to the biometric management function, the template data manager configured to create a biometric template by converting the biometric data; and a biometric data cache coupled to the template data manager, the biometric data cache configured to store a plurality of stored biometric templates, wherein the template data manager compares the created biometric template with the plurality of stored biometric templates to form a biometric score. The biometric score may comprise a probability of an enrolled biometric user and the biometric data representing the same identity or may result in a biometric authentication of a biometric user when the biometric score exceeds a threshold. The biometric data may comprise a plurality of biometric data.

DETAILED DESCRIPTION OF PREFERRED EMBODIMENTS

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings, and examples are not meant to be limiting. Other embodiments may be used and/or other changes may be made without departing from the spirit or scope of the present disclosure.

DEFINITIONS

As used herein, "Biometric Authentication" may consist of methods for uniquely recognizing humans based upon one or more intrinsic physical or behavioral traits.

As used herein, "Biometric Verification" may consist of using biometric authentication to verify the identity of a person.

As used herein, "Biometric Identification" may consist of using biometric authentication to identify a person among a biometrically enrolled population.

As used herein, "Biometric Enrollment" may refer to the act of creating and storing biometric data (templates) from captured biometric images or other biometric data for the purpose of biometric authentication (i.e. verification and/or identification).

As used herein, "Biometric Probe" may be a captured biometric that is used to compare and match against a prior biometric enrollment.

As used herein, "Biometric Score (or Match Score)" may be a probability score that a given biometric enrollment and a given biometric probe represent the same identity.

As used herein, "Biometric Fusion Score" may be a probability score that multiple biometric enrollments of one or more biometric modalities match multiple biometric probes of the same modalities. The scores of each modality have been normalized and combined (i.e. fused) to create a single probability score.

As used herein, "Biometric Capture" may refer to the act of using a biometric input device or system to capture biometric probe in the form of images, templates, or other form.

As used herein, "Biometric Data" may refer to data that is used to verify or identify a person based on physical traits or behaviors. Examples of biometric data include images of fingerprints, faces, irises, and binary data generated by biometric algorithms that are used for biometric enrollment, identity verification, and identification.

As used herein, "Biometric Template" may be a piece of binary data generated by a biometric algorithm that is used to compare one biometric against another.

As used herein, "Demographic Data" may refer to non-biometric data that intrinsically identifies a person. Examples of demographic data may include name(s), height, weight, birth date, race/color, hair color, current location, location of origin, among others.

As used herein, "Query Engine" may refer to a system capable of comparing biometric templates and may return a biometric score or a biometric fusion score.

As used herein, "Query Router" may refer to a system that may manage and queue in a query engine.

As used herein, "Biometric Management Functions" may refer to a set of intrinsic or user defined functions developed to extend the functionality of a relational database management system to be able to execute queries with biometric constraints.

As used herein, "Result Set" may refer to data returned from a query.

As used herein, "Query Parameter" may refer to data provided in a query in order to limit or process query returned results.

As used herein, "Transaction" may refer to a sequence of operations performed as a single logical unit of work.

Figure 1:
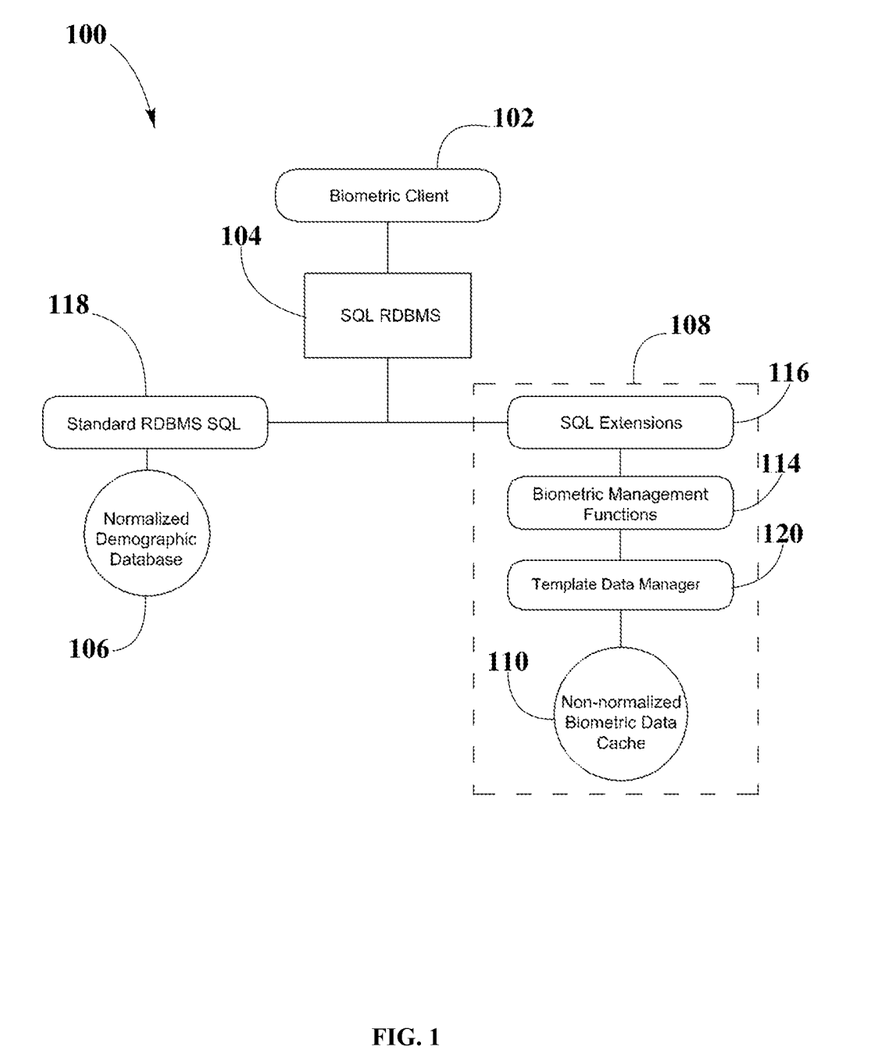
FIG. 1 shows a block diagram of an embodiment of the biometrically enabled database architecture.

Referring first to FIG. 1, a block diagram of a biometrically enabled database infrastructure 100 is shown. Included in database infrastructure 100 are a biometric client 102, a relational database management system (SQL RDBMS 104), a normalized demographic database 106, and a biometric subsystem 108.

According to an embodiment, SQL RDBMS 104 may be operatively connected to a biometric client 102 which may comprise a computer having installed a suitable device for capturing biometric probes, as well as a suitable input device for text input. SQL RDBMS 104 may comprise a conventional relational database management system such as Microsoft SQL Server, Oracle, MySql and/or other suitable relational database management systems.

Demographic database 106 is a normalized relational database containing demographic data, wherein said demographic data may be managed in normalized SQL tables using the standard RDBMS SQL language 118. The information stored in demographic database 106 may include name, address, phone number, email address, identification number (s), date of birth, citizenship and/or other demographic information. Additionally, there may be application-specific information stored in demographic database 106. For example, an accounting department may store information related to payroll, accounts payable, accounts receivable, inventory cost, revenues and/or other application-specific information in demographic database 106. In another example, a customs database may contain information about crossing time and declarations from various border crossings. Demographic database 106 may comprise a plurality of tables containing different data and each table may contain a field that uniquely identifies each record.

SQL RDBMS 104 may be operatively connected to biometric subsystem 108 through SQL extensions 116. A non-normalized biometric data cache 110 may be added to SQL RDBMS 104 to store biometric data, specifically in the form of biometric templates. Biometric data cache 110 may be a real time high performance database in a biometric data cache format. Biometric data cache 110 may not contain any demographic data, wherein all demographic data is instead contained in demographic database 106 in the form of normal SQL tables. Biometric templates stored in biometric data cache 110 may include 2D face, 3D face, Iris, retina, finger vein, palm vein, single fingerprint, fingerprints, scans of the flat of a palm, writers palm, hand geometry, dental records, signature, voice, nuclear DNA, mitochondrial DNA, keystroke, gait, smell and/or any other biometric feature that can be digitally analyzed. Biometric data cache 110 may also have a unique non-intrinsic identifier to associate a biometric template with their corresponding identity defined in normal SQL tables within demographic database 106.

Biometric subsystem 108 may also include a set of intrinsic or user defined biometric management functions 114. Biometric management functions 114 may be created and configured using SQL extensions 116, wherein the structured query language (SQL) of SQL RDBMS 104 may be extended, providing SQL RDBMS 104 with the capability of executing SQL statements against biometric data cache 110. For instance, in an embodiment wherein Microsoft SQL Server may be used as SQL RDBMS 104, extended stored procedures packaged over dynamic-link libraries (DLLs) may extend Microsoft SQL Server functionality through functions developed by using C/C++ or any other compatible programing language, the Open Data Services API, and the Microsoft Win32 API. These functions can send result sets and output parameters back to a client from a plurality of external data sources. Many commercial and open source RDBMS have similar or comparable functionality.

According to an embodiment, biometric subsystem 108 may also include a template data manager 120 to work in conjunction with biometric management functions 114 and biometric data cache 110. Template data manager 120 may create new biometric templates accordingly to biometric probes received from biometric client 102 and match said created biometric templates against previously stored biometric templates in biometric data cache 110 based on matching parameters provided by biometric management functions 114. For instance, when a fingerprint type biometric probe is captured from biometric client 102 and analyzed by biometric management functions 114, template data manager 120 may create a biometric template and compare it against biometric templates stored in biometric data cache 110. The result of the comparison is a biometric score which may represent a probability that the biometric probe captured corresponds to the same individual as the biometric template it's being compared against. The biometric subsystem 108 may return the biometric score to the SQL RDBMS 104, wherein said biometric score may be associated with the corresponding identity(s) stored in normal SQL tables of demographic database 106, and subsequently merged into a single result set containing demographic data and respective biometric score.

Database infrastructure 100 may be able to process SELECT, INSERT, DELETE, UPDATE and/or any other SQL statements with biometric and demographic query constraints or parameters.

Figure 2:
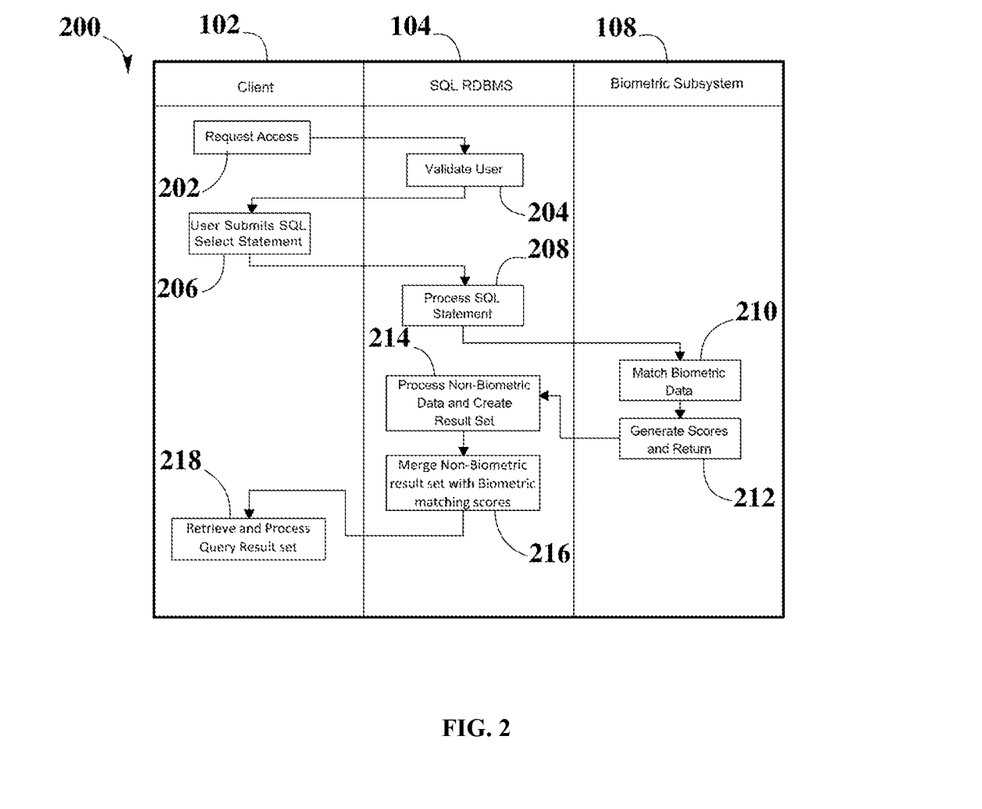
FIG. 2 illustrates an embodiment of a swim lane diagram of a select execution process in a biometrically enabled relational database system.

FIG. 2 is an embodiment that illustrates a query execution process 200 in database infrastructure 100. The depicted process may begin at block 202, wherein a biometric client 102 may request access to SQL RDBMS 104. In block 204, SQL RDBMS 104 may analyze the request and either may deny or grant access depending on biometric client 102 provisioned access rights. The validation process performed at block 204 may be a conventional user/password authentication process in combination with a biometric authentication system, or any other suitable process for verifying user's access rights to SQL RDBMS 104. Once biometric client 102 has been granted access to SQL RDBMS 104, biometric client 102 may execute a SQL SELECT statement against SQL RDBMS 104, at block 206. SQL RDBMS 104 may then act as a query router in block 208 and distribute biometric probes and biometric constraints to biometric subsystem 108 for processing.

Subsequently at block 210, biometric management functions 114 and template data manager 120 within biometric subsystem 108 may analyze and convert biometric probe into a biometric template to match against previously stored biometric templates in biometric data cache 110. From said matching process, biometric scores may be generated and returned to SQL RDBMS 104, at block 212. Following the process, at block 214, SQL RDBMS 104 may analyze non-biometric data from the normal SQL tables in the normalized demographic database 106, generating a result set. At block 216, SQL RDBMS 104 may then merge the results set generated at block 214 and the biometric scores generated at block 212 into a single result set, wherein said single result set can then be returned to the biometric client 102 application, at block 218.

In another embodiment, a SQL SELECT statement may be used for a biometric identification process. For instance, a SQL SELECT statement may include a fingerprint image as a biometric probe along with a biometric score threshold. In biometric subsystem 108, the fingerprint type biometric probe may then be converted into a biometric template using biometric management functions 114 and template data manager 120, and subsequently compared against stored biometric templates in biometric data cache 110. The matching process may be performed until a list of candidates that meet the minimum biometric score threshold is generated. The biometric subsystem 108 may then return said list of matches to the SQL RDBMS 104 to be associated with a first name and last name contained in the normal SQL tables of the demographic database 106. As such, SQL RDBMS 104 may return to the biometric client 102 a list of potential candidates that match the biometric constraints in the SQL SELECT statement. In other embodiments, the SQL SELECT statement may return demographic data with no associated biometric scores or biometric scores with no associated demographic data.

Figure 3:
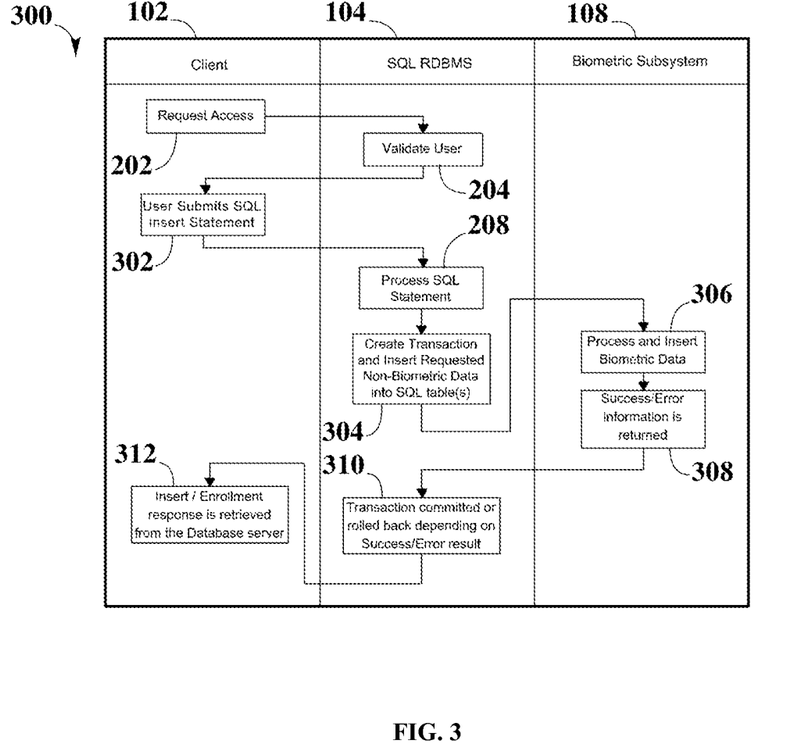
FIG. 3 illustrates an embodiment of a swim lane diagram of an insert execution process in a biometrically enabled relational database system.

FIG. 3 depicts an embodiment for an INSERT execution process 300 in database infrastructure 100. Similarly to query execution process 200, the INSERT execution process 300 may begin at block 202, wherein the SQL RDBMS 104 receives an access request from a biometric client 102 and continues at block 204, wherein biometric client 102 is authenticated against the SQL RDBMS 104. After biometric client 102 has been granted access to SQL RDBMS 104, biometric client 102 may execute a SQL INSERT statement(s) against SQL RDBMS 104, at block 302. SQL RDBMS 104 may then process the INSERT statement(s) and identify the non-biometric data and the biometric probe of the INSERT statement(s) at block 208. For INSERT statements, a transaction may be created and the non-biometric data may be is stored in the normal SQL tables within demographic database 106, at block 304. The biometric probe may be sent to biometric subsystem 108 to be analyzed and converted into a biometric template, which then can be inserted or stored in biometric data cache 110, at block 306. Subsequently, biometric subsystem 108 may return a success or failure message to the SQL RDBMS 104 at block 308. SQL RDBMS 104 may then analyze the success/failure message and may either commit the transaction or roll back the transaction, at block 310. Finally, biometric client 102 may retrieve a success/failure message from the SQL RDBMS 104, at block 312.

In another embodiment, an SQL INSERT statement may be used for the enrollment process of new biometric clients 102. For instance, an SQL INSERT statement may include a fingerprint image as biometric probe, and the name and last name associated with said fingerprint. The SQL INSERT statement may then be processed by SQL RDBMS 104, wherein name and last name may be stored in the normal SQL tables within demographic database 106, while in the biometric subsystem 108, the fingerprint biometric probe may be analyzed and converted into a biometric template to be stored in biometric data cache 110.

Figure 4:
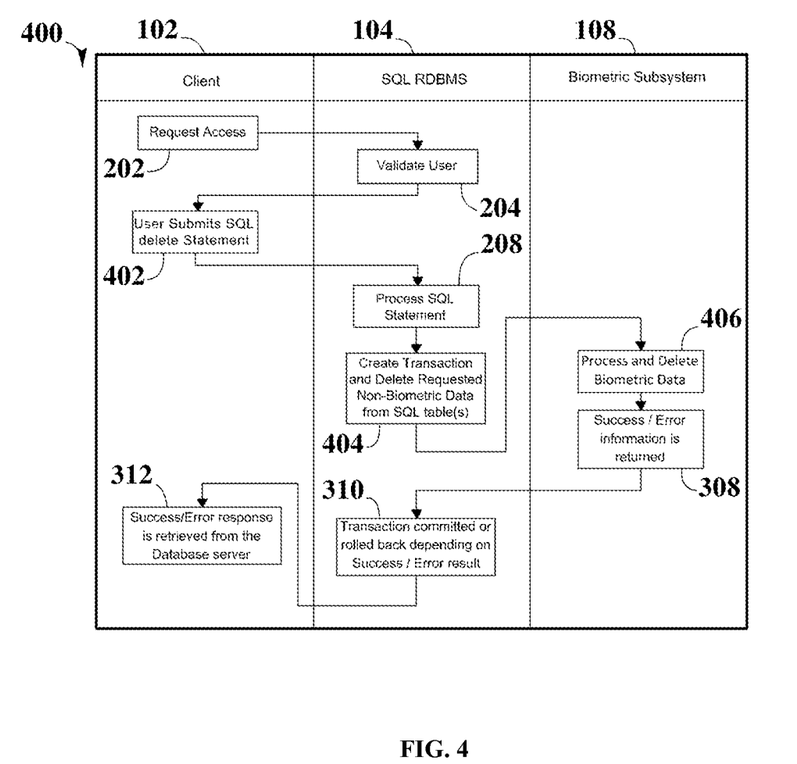
FIG. 4 illustrates an embodiment of a swim lane diagram of a delete execution process in a biometrically enabled relational database system.

FIG. 4 provides yet another embodiment of a DELETE execution process 400 in database infrastructure 100. Similarly to the previous query execution process 200 and INSERT execution process 300, the DELETE execution process 400 may begin at block 202, wherein the SQL RDBMS 104 receives an access request from a biometric client 102 and continues at block 204, wherein biometric client 102 is authenticated against the SQL RDBMS 104. After biometric client 102 has been granted access to SQL RDBMS 104, biometric client 102 may submit SQL DELETE statement(s) against SQL RDBMS 104, at block 402. SQL RDBMS 104 may then process the DELETE statement(s) and identify the non-biometric data and the biometric probe of the DELETE statement(s), at block 208.

Following the process in FIG. 4, SQL RDBMS 104 may generate a transaction and delete biometric/demographic data from the normal SQL tables within demographic database 106, at block 404. Subsequently, biometric subsystem 108 may erase the biometric templates from biometric data cache 110 associated with biometric probes, at block 406. Biometric subsystem 108 may return a success or failure message to the SQL RDBMS 104, at block 308. SQL RDBMS 104 may then analyze the success/failure message and may either commit the transaction or roll back the transaction, at block 310. Finally, biometric client 102 may retrieve a success/failure message from the SQL RDBMS 104, at block 312.

In other embodiments, a SQL DELETE statement may be executed in database infrastructure 100 to remove demographic data and biometric templates from demographic database 106 and biometric data cache 110 respectively, for different purposes such as but not limited to, elimination of corrupted data or data no longer required, and database optimization.

Figure 5:
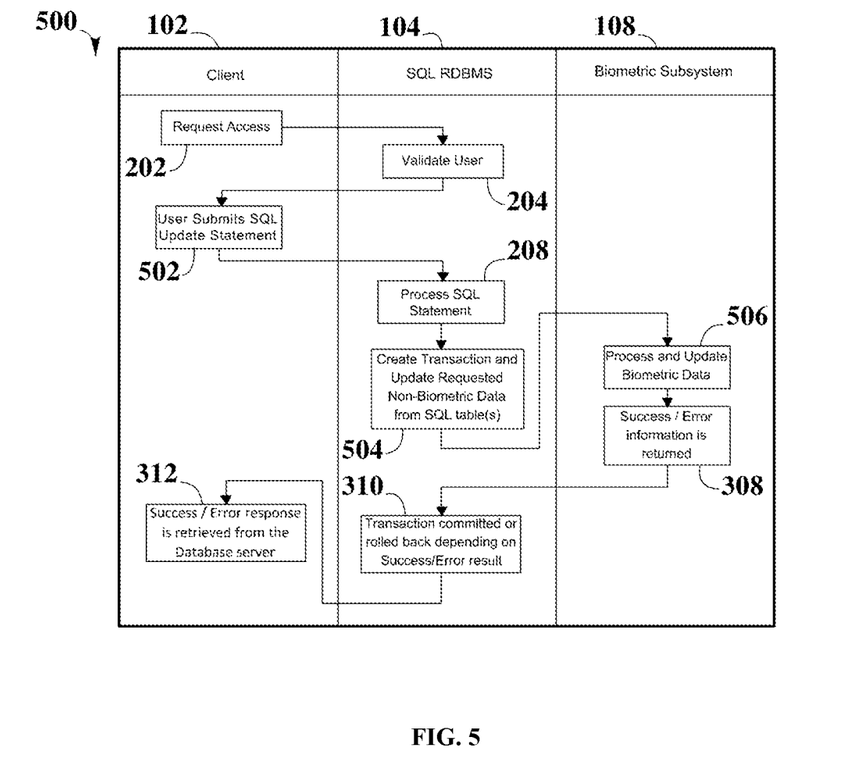
FIG. 5 illustrates an embodiment of a swim lane diagram of an update execution process in a biometrically enabled relational database system.

FIG. 5 provides yet another embodiment of an UPDATE execution process 500 in database infrastructure 100. Similarly to the previous query execution process 200, INSERT execution process 300, and DELETE execution process 400, the UPDATE execution process 500 may begin at block 202, wherein SQL RDBMS 104 receives an access request from biometric client 102 and continues at block 204, wherein biometric client 102 is authenticated against SQL RDBMS 104. After biometric client 102 has been granted access to SQL RDBMS 104, biometric client 102 may submit SQL UPDATE statement(s) against SQL RDBMS 104, at block 502. SQL RDBMS 104 may then process the UPDATE statement(s) and identify the non-biometric data and the biometric probe of the UPDATE statement(s), at block 208.

At block 504, SQL RDBMS may then generate a transaction and update the demographic/biographic data stored in the normal SQL tables within demographic database 106. Subsequently, biometric subsystem 108 may update the biometric templates from biometric data cache 110 associated with biometric probes, at block 506. Biometric subsystem 108 may return a success or failure message to the SQL RDBMS 104, at block 308. SQL RDBMS 104 may then analyze the success/failure message and may either commit the transaction or roll back the transaction, at block 310. Finally, biometric client 102 may retrieve a success/failure message from the SQL RDBMS 104, at block 312.

According to an embodiment, SQL UPDATE statement may be executed in database infrastructure 100 to update either demographic data or biometric templates that may have changed in time or that may have not been saved properly in database infrastructure 100 during a previous enrollment process.

Figure 6:
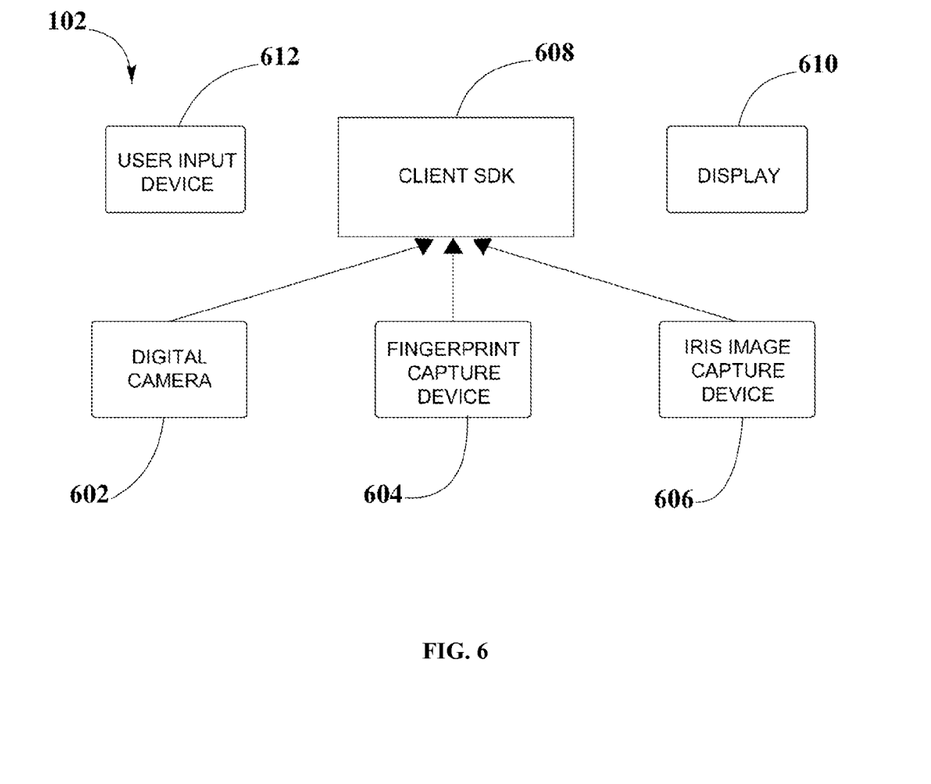
FIG. 6 illustrates an embodiment of a multimodal biometric client.

Referring now to FIG. 6, a high level block diagram of a multimodal biometric client 102 is depicted according to an embodiment. Biometric client 102 may include commercially available biometric input and capture devices, such as a digital camera 602 for capturing facial images, a fingerprint scanner 604 and an iris image capture device 606. Biometric client 102 may also include a client SDK 608 that collects and formats biometric data captured by the capture device for transmission to SQL RDBMS 104 and presents information returned from SQL RDBMS 104. Biometric client 102 may include a display 610 and a user input device 612, such as a keypad, keyboard, mouse or the like.

The embodiment of a multimodal biometric client 102 shown in FIG. 6 may operate in database infrastructure 100 during a query execution process 200. When a multimodal biometric client 102 includes different modalities of biometric probes such as face, fingerprint, iris, among others, biometric management functions 114 in conjunction with template data manager 120 may analyze and convert each of the biometric probes into corresponding biometric templates for matching against stored biometric templates in biometric data cache 110, at block 210. Matching may result in individual scores for each type of biometric template being compared. The biometric scores generated for the different modalities of biometric probes may be combined into a single fusion biometric score, and biometric subsystem 108 may then return said fusion biometric score to SQL RDBMS 104, at block 212. All other steps before and after block 210, 212 may be executed as depicted in FIG. 2.

Figure 7:
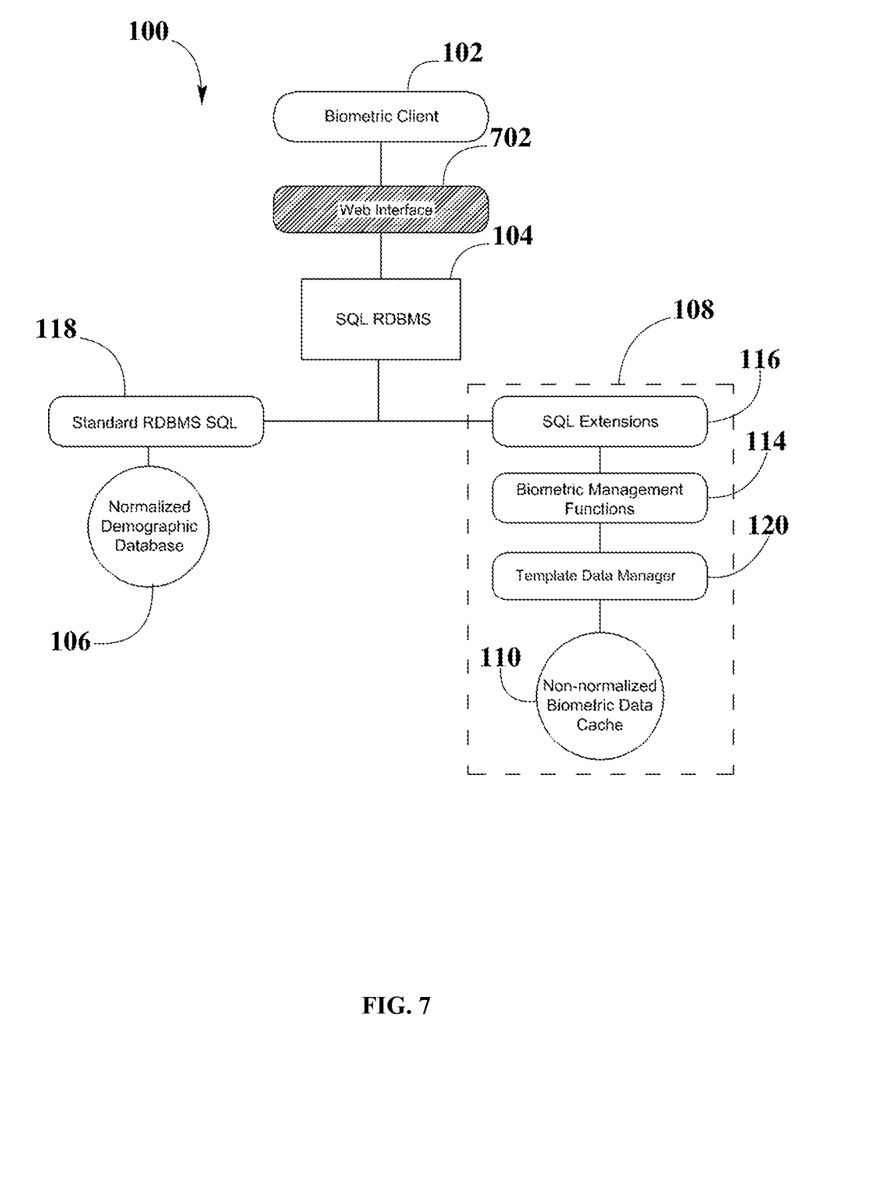
FIG. 7 illustrates an embodiment of a connection between a biometric client application and biometrically enabled database architecture over a web interface.

FIG. 7 shows another embodiment of database infrastructure 100, wherein biometric client 102 may be operatively connected to SQL RDBMS 104 through a suitable web interface 702 so database infrastructure 100 may operate as a platform as a service (PAAS) application. Web interface 702 may use simple object access protocol (SOAP), extensible markup language (XML) protocol and representation state transfer (REST) protocol, or other suitable network communication protocols for connecting biometric client 102 to SQL RDBMS 104. Biometric client 102 may comprise a computing device having installed a suitable networking module to provide network connectivity. By using web interface 702, biometric clients 102 may execute SQL SELECT, INSERT, DELETE, and UPDATE statements in database infrastructure 100 as described in FIG. 2-5.

In another embodiment, the security for accessing information from demographic database 106 and biometric data cache 110 in SQL RDBMS 104 may be enhanced by the use of relational database views. During a query execution in database infrastructure 100, database views may limit the access to demographic data in the normal SQL tables and biometric templates, wherein database views may contain tabular data structure about specific sections of demographic database 106 and biometric data cache 110. Biometric client 102 may then execute SQL statements against said relational database views instead of directly against demographic database 106 and/or biometric data cache 110.

EXAMPLES

Example #1 is an embodiment wherein a police law enforcement application is configured to use database infrastructure 100. The law enforcement application or biometric client 102 may need to identify a possible suspect using fingerprints. The law enforcement application provides at least one biometric probe from said individual and executes the following query against SQL RDBMS 104:

SELECT FirstName, LastName, Score1=BiometricScore (Fingerprint[fprintjpeg])
FROM Identities
WHERE Score1>0.90

SQL RDBMS 104 may then execute this statement wherein BiometricScore is executed against biometric data cache 110 in biometric subsystem 108, where BiometricScore may be intrinsic functions or a user defined functions created by extending the SQL language of SQL RDBMS 104. FirstName and LastName fields may be processed against normalized demographic database 106. Identities may be a SQL table in normalized demographic database 106. The SQL statement may then return a result set containing the first name and the last name plus a biometric score that meets the biometric restraint (>0.90) of the query statement.

Example #2 is an embodiment wherein a police law enforcement application or biometric client 102 may need to enroll a person in database infrastructure 100. The law enforcement application provides first name and last name, along with at least one biometric probe from said individual and executes the following query against SQL RDBMS 104:

INSERT INTO Identities (FirstName, LastName, BIO_FPrint) VALUES ('ExFirstName','ExLastName', fprint.jpeg)

SQL RDBMS 104 may then execute this statement wherein BIO_FPrint is executed against biometric data cache 110 in biometric subsystem 108, where BIO_FPrint may be intrinsic function or a user defined function created by extending the SQL language of SQL RDBMS 104. FirstName and LastName fields may be processed and stored over normalized demographic database 106. Identities may be a SQL table in normalized demographic database 106. The SQL statement may insert the ExName and ExLastName into the demographic database 106, while the fprint.jpeg in the form of a biometric template may be inserted in the biometric data cache 110.

Example #3 is an embodiment wherein a police law enforcement application or biometric client 102 may need to update biometric data on a person due to an error during enrollment in database infrastructure 100. The law enforcement application provides first name and last name, along with at least one biometric probe from said individual and executes the following query against SQL RDBMS 104:

UPDATE Identities SET ExFName="ExFirstName", ExLName="ExLastName", Fingerprint("c:\image\fprint.jpeg")
WHERE UserId=12345

SQL RDBMS 104 may then execute this statement wherein Fingerprint is executed against biometric data cache 110 in biometric subsystem 108, where FingerPrint may be an intrinsic function or a user defined function created by extending the SQL language of SQL RDBMS 104. FirstName and LastName fields may be processed and stored over normalized demographic database 106. Identities may be a SQL table in the normalized demographic database 106. The SQL statement may update the ExName and ExLastName into demographic database 106 wherever the UserId is equal to 12345, and may also update the corresponding biometric template (fprint.jpeg) in biometric data cache 110.

Example #4 is an embodiment wherein a police law enforcement application or biometric client 102 may require deleting demographic and biometric data related to a person due to an error that occurred during enrollment in database infrastructure 100. The law enforcement application provides first name and last name, along with at least one biometric probe from said individual and executes the following query against SQL RDBMS 104:

DELETE FROM Identities, BiometricData
WHERE UserId=12345

SQL RDBMS 104 may then execute this statement wherein BiometricData is executed against biometric data cache 110 in biometric subsystem 108, where BiometricData may be intrinsic function or a user defined function created by extending the SQL language of SQL RDBMS 104. Identities may be a SQL table in normalized demographic database 106. The SQL statement may then delete all records and associated biometric templates wherever UserId=12345.

Example #5 is an embodiment wherein a police law enforcement application is configured to use database infrastructure 100. The law enforcement application or biometric client 102 may need to identify a possible suspect using fingerprints and iris. The law enforcement application provides one or more biometric probes from said individual and executes the following query against SQL RDBMS 104:

SELECT FirstName, Lastname, Score1=BiometricScore(Fingerprint[fprint.jpeg]), Score2=BiometricScore(RIris[RIris.jpeg]) FROM Identities
WHERE Score1>0.90
AND Score2>0.80

SQL RDBMS 104 may then execute this statement wherein BiometricS core is executed against biometric data cache 110 in biometric subsystem, where BiometricScore may be intrinsic functions or a user defined functions created by extending the SQL language of SQL RDBMS 104. FirstName and LastName fields may be processed against normalized demographic database 106. Identities may be a SQL table in normalized demographic database 106. The SQL statement may then return a result set containing the first name and the last name associated with the biometric scores for each of the biometric probes that meet the biometric constraints (>0.90 and >0.80) of the query statement.

Example #6 is an embodiment wherein a police law enforcement application is configured to use database infrastructure 100. The law enforcement application or biometric client 102 may need to identify a possible suspect using fingerprints and iris. The law enforcement application provides one or more biometric probes from said individual and executes the following query against SQL RDBMS 104:

SELECT FirstName, Lastname, Score1=BiometricFusedScore(Fingerprint[fprint.jpeg], RIris [RIris.jpeg]) FROM Identities
WHERE Score1>0.90

SQL RDBMS 104 may then execute this statement wherein BiometricFusedScore is executed against biometric data cache 110 in biometric subsystem 108, where BiometricFusedScore may be intrinsic functions or a user defined functions created by extending the SQL language of SQL RDBMS 104. FirstName and LastName fields may be processed against normalized demographic database 106. Identities may be a SQL table in normalized demographic database 106. The SQL statement may then return a result set containing the first name and the last name associated with a biometric fusion score that meet the biometric restraint (>0.90) of the query statement.

What is claimed is:

1. A relational database management system performing biometric authentication comprising:
    a structured query language relational database management system comprising a demographic database configured to store demographic data for a plurality of users; and
    a biometric subsystem operatively coupled to the structured query language relational database management system, wherein the biometric subsystem comprises:
    a biometric management function configured to receive and analyze biometric data to authenticate access of a user;
    a template data manager coupled to the biometric management function, the template data manager configured to create a biometric template by converting the biometric data captured from the user;
    a biometric data cache coupled to the template data manager, the biometric data cache configured to store a plurality of stored biometric templates,
    wherein the template data manager compares the created biometric template with the plurality of stored biometric templates to form a biometric score for the user, and
    wherein the structured query language relational database management system retrieves the demographic data of the user and associates the biometric score with the demographic data of the user.

2. The system of claim 1, wherein the biometric score comprises a probability of an enrolled biometric user and the biometric data representing the same identity.

3. The system of claim 1, wherein the biometric score results in a biometric authentication of a biometric user when the biometric score exceeds a threshold.

4. The system of claim 1, wherein the biometric data comprises a plurality of biometric data.

5. The system of claim 4, wherein the plurality of biometric data comprises an iris, a face, or a fingerprint.

6. The system of claim 1 further comprising a structured query language extension coupled to the biometric management function.

7. The system of claim 6, wherein the structured query language extension is configured to couple to the structured query language relational database management system.

8. The system of claim 7, wherein the structured query language comprises a select statement, an insert statement, a delete statement, or an update statement.

9. The system of claim 1, wherein the biometric data is provided through a biometric user through a web interface.

10. The system of claim 9, wherein the web interface provides the biometric data over a network.

11. The system of claim 10, wherein the network comprises the Internet.

12. The system of claim 1, wherein the biometric data cache comprises a non-normalized biometric data cache.

13. A method of biometric authentication using a relational database management system comprising:
retrieving demographic data of a user from a demographic database in a structured query language relational database management system;
receiving and analyzing biometric data using a biometric management function;
creating a biometric template using a template data manager by converting the biometric data; and
storing a plurality of stored biometric templates using a biometric data cache,
wherein the template data manager compares the created biometric template with the plurality of stored biometric templates to form a biometric score, and
wherein the structured query language relational database management system associates the biometric score with the demographic data of the user.

14. The method of claim 13, wherein the biometric score comprises a probability of an enrolled biometric user and the biometric data representing the same identity.

15. The method of claim 13, wherein the biometric score results in a biometric authentication of a biometric user when the biometric score exceeds a threshold.

16. The method of claim 13, wherein the biometric data comprises a plurality of biometric data.

17. A system comprising:
a structured query language relational database management system comprising a demographic database configured to store demographic data for a plurality of users;
a biometric subsystem coupled to the structured query language relational database management system via a structured query language extension, wherein the biometric subsystem comprises:
a biometric management function configured to receive and analyze biometric data to authenticate access of a user;
a template data manager coupled to the biometric management function, the template data manager configured to create a biometric template by converting the biometric data captured from the user; and
a non-normalized biometric data cache coupled to the template data manager, the biometric data cache configured to store a plurality of stored biometric templates,
wherein the template data manager compares the created biometric template with the plurality of stored biometric templates to form a biometric score for the user, and
wherein the structured query language relational database management system retrieves the demographic data of the user and associates the biometric score with the demographic data of the user.

18. The system of claim 17, wherein the biometric score comprises a probability of an enrolled biometric user and the biometric data representing the same identity.

19. The system of claim 17, wherein the biometric score results in a biometric authentication of a biometric user when the biometric score exceeds a threshold.

20. The system of claim 17, wherein the biometric data comprises a plurality of biometric data.

* * * * *